(12) United States Patent
Gu et al.

(10) Patent No.: US 12,669,216 B2
(45) Date of Patent: Jun. 30, 2026

(54) QUICK-RELEASE TROUGH PLATE HANGER

(71) Applicant: Jiaxing Yihe Intelligent Manufacturing Co., Ltd., Jiaxing (CN)

(72) Inventors: Chunming Gu, Jiaxing (CN); Yao Gu, Jiaxing (CN)

(73) Assignee: Jiaxing Yihe Intelligent Manufacturing Co., Ltd., Jiaxing (CN)

( * ) Notice: Subject to any disclaimer, the term of this patent is extended or adjusted under 35 U.S.C. 154(b) by 0 days.

(21) Appl. No.: 18/967,613

(22) Filed: Dec. 3, 2024

(65) Prior Publication Data

US 2025/0361980 A1 Nov. 27, 2025

(30) Foreign Application Priority Data

May 21, 2024 (CN) .......................... 202421109915.1

(51) Int. Cl.
*F16M 13/02* (2006.01)

(52) U.S. Cl.
CPC ....... *F16M 13/022* (2013.01); *F16M 2200/02* (2013.01)

(58) Field of Classification Search
CPC ............ E04D 13/0722; E04D 13/0725; E04D 13/064; F16M 13/022; F16M 2200/02
USPC ..... 248/694, 544, 685, 689, 674, 48.1, 48.2, 248/237, 220.21
See application file for complete search history.

(56) References Cited

U.S. PATENT DOCUMENTS

| | | | | |
|---|---|---|---|---|
| 873,578 | A | * | 12/1907 | Molyneux ........... E04D 13/0725 248/48.2 |
| 1,017,174 | A | * | 2/1912 | Sander et al. ...... E04D 13/0722 248/48.1 |
| 2,631,801 | A | * | 3/1953 | Toal .................... E04D 13/0725 248/48.1 |
| 4,623,177 | A | * | 11/1986 | McKinney .......... E05B 65/0014 292/DIG. 60 |
| 5,088,682 | A | * | 2/1992 | Gibbs ................... E04D 13/158 248/316.4 |
| 5,268,969 | A | * | 12/1993 | Duran, Jr. ............. B65D 33/14 220/9.4 |
| 5,884,876 | A | * | 3/1999 | Axford ............... E04D 13/0722 248/48.1 |
| 6,168,125 | B1 | * | 1/2001 | Winger ................. A47H 1/144 248/48.1 |

(Continued)

*Primary Examiner* — Terrell L McKinnon
*Assistant Examiner* — Michael McDuffie

(57) ABSTRACT

A quick-release trough plate hanger comprises a mounting plate, a clamping plate and a locking mechanism, wherein the clamping plate is slidably mounted on the mounting plate, the clamping plate is locked with the mounting plate through the locking mechanism, and a hanging strip is fixed on the clamping plate; the locking mechanism comprises a lock body mounted on the clamping plate and a zipper key; a sliding groove is formed in the lock body, and the zipper key is disposed in the sliding groove; the zipper key comprises a lock head a sliding block, a connecting post and a clamping post which are connected in sequence. The locking mechanism is disposed on the clamping plate, and the clamping plate can be locked and unlocked on the mounting plate by pulling the zipper key; the clamping plate can be locked by the locking mechanism at the corresponding position without movement.

6 Claims, 3 Drawing Sheets

(56)  References Cited

U.S. PATENT DOCUMENTS

| | | | | |
|---|---|---|---|---|
| 7,451,956 B2 * | 11/2008 | Bohlen | ................... | E06B 9/323 |
| | | | | 248/265 |
| 7,624,541 B2 * | 12/2009 | Gentry | ................. | E04D 13/076 |
| | | | | 52/12 |
| 8,272,377 B2 * | 9/2012 | Tsakiris | ............. | F24C 15/2071 |
| | | | | 126/300 |
| 8,479,900 B2 * | 7/2013 | Scicluna | ............. | A45C 7/0022 |
| | | | | 248/223.41 |
| 8,505,864 B1 * | 8/2013 | Taylor | .................... | H02S 20/23 |
| | | | | 52/173.3 |
| 8,840,080 B1 * | 9/2014 | Gordon | ................. | F16M 13/02 |
| | | | | 248/544 |
| 10,563,387 B1 * | 2/2020 | Iocco | ..................... | E03C 1/324 |
| 10,774,978 B2 * | 9/2020 | Somoano | ............ | F16M 13/022 |
| 2007/0241249 A1 * | 10/2007 | Ford | ........................ | E06B 9/02 |
| | | | | 248/220.21 |
| 2010/0117497 A1 * | 5/2010 | Wu | ........................ | G06F 1/181 |
| | | | | 248/220.21 |
| 2015/0284961 A1 * | 10/2015 | Iannelli | .............. | E04D 13/0725 |
| | | | | 248/48.2 |

* cited by examiner

5

4

QUICK-RELEASE TROUGH PLATE HANGER

CROSS-REFERENCE TO RELATED APPLICATION

This application claims priority of Chinese Patent Application No. 202421109915.1, filed on May 21, 2024, the entire contents of which are incorporated herein by reference.

TECHNICAL FIELD

The present disclosure relates to the technical field of trough plate hanger, in particular to the technical field of a quick-release trough plate hanger.

BACKGROUND

When the existing trough plate hanger is used, it is usually fixed by being clamped into the chute of the trough plate. When this structure is installed and disassembled, it is necessary to move the whole hanger to the opening of the chute, which is troublesome to disassemble and assemble, and the hanger is prone to displacement and shaking, and the fixing effect is not good.

SUMMARY

The object of the present disclosure is to solve the problems in the prior art, and proposes a quick-release trough plate hanger, which can solve the above problems.

In order to achieve the above object, the present disclosure provides a quick-release trough plate hanger, which includes a mounting plate, a clamping plate and a locking mechanism, wherein the clamping plate is slidably mounted on the mounting plate, the clamping plate is locked with the mounting plate through the locking mechanism, and a hanging strip is fixed on the clamping plate; the locking mechanism includes a lock body and a zipper key, and the lock body is installed on the clamping plate; the lock body is internally provided with a sliding groove, and the zipper key is disposed in the sliding groove; the zipper key includes a lock head, a sliding block, a connecting post and a clamping post which are connected in sequence; the lock head protrudes from the sliding groove, the lock head is provided with a limit groove; the lock body is provided with a limit plate matched with the limit groove, and a spring is disposed between the sliding block and the sliding groove; the clamping plate is provided with a movable groove through which the connecting post passes, and the mounting plate is provided with a clamping structure matched with the clamping post.

Preferably, the mounting plate is provided with a recess, and the two ends of the recess are provided with edge clips; one side of the clamping plate is turned inwards to form an L-shaped groove, and the other side is turned inwards to form a C-shaped groove; the clamping post is disposed in the L-shaped groove, the edge clip on one side is clamped with the clamping post, and the edge clip on the other side is slidably installed in the C-shaped groove.

Preferably, the edge clip has an n-shaped structure.

Preferably, the lock body is fixed on the clamping plate by bolts.

Preferably, a side surface of the sliding groove is provided with a mounting post, and a side surface of the sliding block close to the mounting post is provided with a mounting groove; and one end of the elastic member is connected with the mounting post and the other end thereof is connected with the mounting groove.

Preferably, the mounting plate is provided with two L-shaped grooves; one side of the clamping plate is provided with an L-shaped plate, and the other side is provided with the clamping post; and the L-shaped plate is slidably installed in one of the L-shaped grooves, and the clamping pos is clamped into the other L-shaped groove.

The present disclosure has the advantages that the locking mechanism is disposed on the clamping plate, and the clamping plate can be locked and unlocked on the mounting plate by pulling the zipper key, so that the clamping plate can be detached or installed from any position, which is very convenient; the clamping plate can be locked by the locking mechanism at the corresponding position and is not easy to move and shake, and the positioning effect is good; the locking mechanism of the present disclosure can be installed in a matching way with both a general trough plate and a specific metal scraper, and has a wide applicability.

The features and advantages of the present disclosure will be described in detail through examples and attached drawings.

Figure 1:
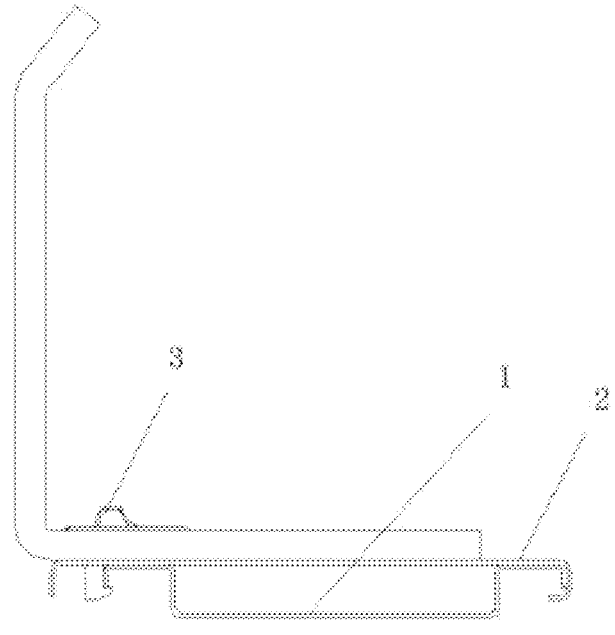
FIG. 1 is a schematic structural diagram of Embodiment 1.
Figure 2:
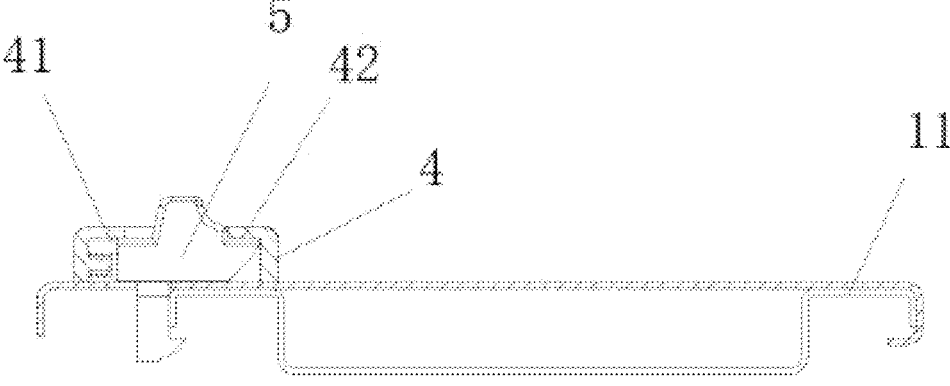
FIG. 2 is a schematic diagram of the installation of the locking mechanism in Embodiment 1.
Figure 3:
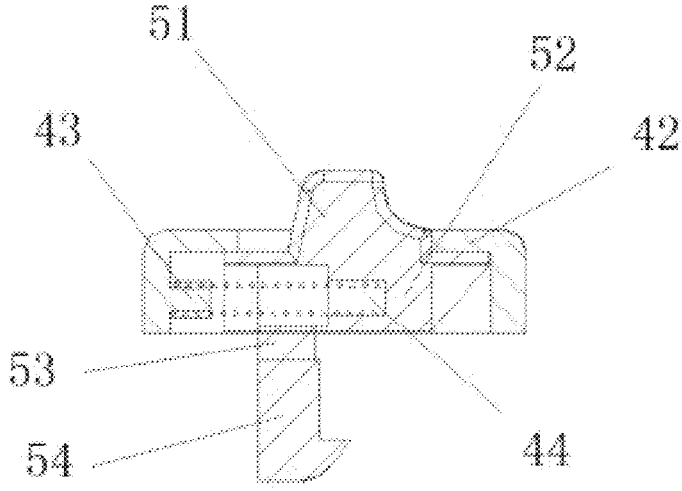
FIG. 3 is an internal schematic view of the locking mechanism of Embodiment 1.
Figure 4:
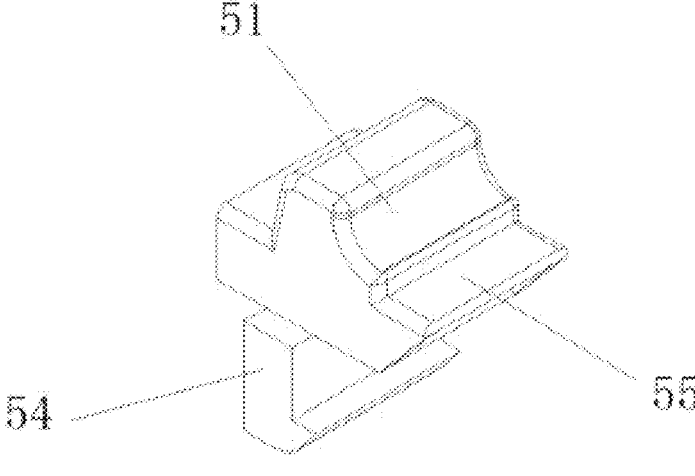
FIG. 4 is a schematic diagram of the structure of the zipper key in Embodiment 1.

Reference signs: 1—Mounting plate; 2—Clamping plate; 3—Locking mechanism; 4—Lock body; 5—Zipper key; 11—Edge clip; 41—Sliding groove; 43—Mounting post; 44—Mounting groove; 51—Lock head; 52—Sliding block; 53—Connecting post; 54—Clamping post; 55—Limit groove.

DESCRIPTION OF EMBODIMENTS

Embodiment 1

Referring to FIGS. 1, 2, 3 and 4, a quick-release trough plate hanger includes a mounting plate 1, a clamping plate 2 and a locking mechanism 3, wherein the clamping plate 2 is slidably mounted on the mounting plate 1, the clamping plate 2 is locked with the mounting plate 1 through the locking mechanism 3, and a hanging strip is fixed on the clamping plate 2; the locking mechanism 3 comprises a lock body 4 and a zipper key 5, and the lock body 4 is installed on the clamping plate 2; the lock body 4 is internally provided with a sliding groove 41, and the zipper key 5 is disposed in the sliding groove 41; the zipper key 5 comprises a lock head 51, a sliding block 52, a connecting post 53 and a clamping post 54 which are connected in sequence; the lock head 51 protrudes from the sliding groove 41, the lock head 51 is provided with a limit groove 55; the lock body 4 is provided with a limit plate 42 matched with the limit groove 55, and a spring is disposed between the sliding block 52 and the sliding groove 41; the clamping plate 2 is provided with a movable groove through which the connecting post 53 passes, and the mounting plate 1 is provided with a clamping structure matched with the clamping post 54. In this embodiment, the mounting plate 1 is a metal hanging plate, which is provided with a recess, and both ends of the recess are provided with edge clips 11. one side of the clamping plate 2 is turned inwards to form an L-shaped groove, and the other side is turned inwards to form a C-shaped groove; the clamping post 54 is disposed in the L-shaped groove, the edge clip 11 on one side is clamped with the clamping post 54, and the edge clip 11 on the other side is slidably installed in the C-shaped groove. The edge clip 11 has an n-shaped structure. The lock body 4 is fixed on the clamping plate 2 by bolts. A side surface of the sliding groove 41 is provided with a mounting post 43, and a side surface of the sliding block 52 close to the mounting post 43 is provided with a mounting groove 44; and one end of the elastic member is connected with the mounting post 43 and the other end thereof is connected with the mounting groove 44.

Embodiment 2

Figure 5:
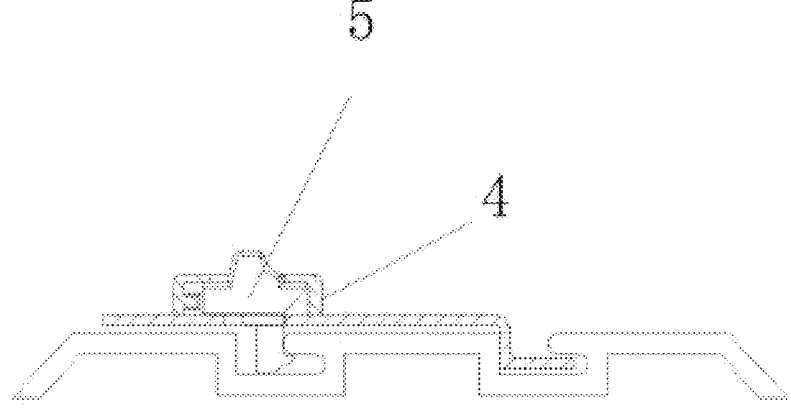
FIG. 5 is a schematic diagram of the installation of the locking mechanism in Embodiment 2.
Figure 6:
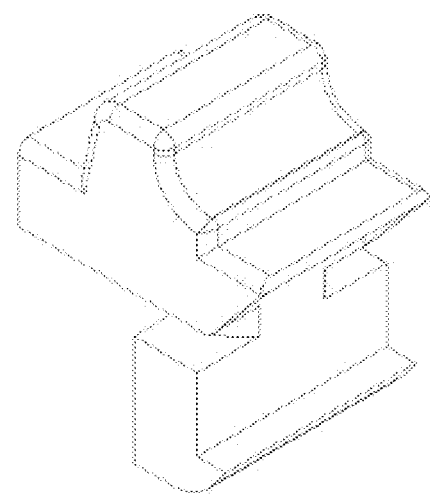
FIG. 6 is a schematic diagram of the structure of the zipper key in Embodiment 2.

Referring to FIG. 5 and FIG. 6, a quick-release trough plate hanger includes a mounting plate 1, a clamping plate 2 and a locking mechanism 3. The clamping plate 2 is slidably mounted on the mounting plate 1, and the clamping plate 2 is locked with the mounting plate 1 through the locking mechanism 3. A hanging strip is fixed on the clamping plate 2, the locking mechanism 3 includes a lock body 4 and a zipper key 5. The lock body 4 is mounted on the clamping plate 2, the lock body 4 is internally provided with a sliding groove 41, and a zipper key 5 is disposed in the sliding groove 41. The zipper key 5 includes a lock head 51, a sliding block 52, a connecting post 53 and a clamping post 54 which are connected in sequence. The lock head 51 protrudes from the sliding groove 41, and a limit groove 55 is formed on the lock head 51. A limit plate 42 matched with the limit groove 55 is disposed on the lock body 4, and a spring is disposed between the sliding block 52 and the sliding groove 41. The clamping plate 2 is provided with a movable groove through which the connecting post 53 passes, and the mounting plate 1 is provided with a clamping structure matched with the clamping post 54. In this embodiment, the mounting plate 1 is a general PVC trough plate with two L-shaped grooves. One side of the clamping plate 2 is provided with an L-shaped plate, and the other side is provided with the clamping post 54. The L-shaped plate is slidably installed in one L-shaped groove, and the clamping post 54 is clamped into the other L-shaped groove.

The work process of that disclosure is as follows:

In the working process, when the present disclosure is installed, firstly the zipper key is pulled to make the clamping post press against the spring, then the clamping plate is installed to the corresponding position of the mounting plate, and then the zipper key is released, so that the clamping post will clamp the clamping structure and fix the clamping plate on the mounting plate; during disassembling, the zipper key is pulled to unlock the clamping post and the clamping structure, and then the clamping plate is removed from the mounting plate.

The above embodiments are intended to illustrate the present disclosure, rather than to limit the present disclosure, and any solution after simple transformation of the present disclosure shall fall within the protection scope of the present disclosure.

The invention claimed is:

1. A quick-release trough plate hanger, comprising a mounting plate (1), a clamping plate (2) and a locking mechanism (3), wherein the clamping plate (2) is slidably mounted on the mounting plate (1), the clamping plate (2) is locked with the mounting plate (1) through the locking mechanism (3), and a hanging strip is fixed on the clamping plate (2); the locking mechanism (3) comprises a lock body (4) and a zipper key (5), and the lock body (4) is installed on the clamping plate (2); the lock body (4) is internally provided with a sliding groove (41), and the zipper key (5) is disposed in the sliding groove (41); the zipper key (5) comprises a lock head (51), a sliding block (52), a connecting post (53) and a clamping post (54) which are connected in sequence; the lock head (51) protrudes from the sliding groove (41), the lock head (51) is provided with a limit groove (55); the lock body (4) is provided with a limit plate (42) matched with the limit groove (55), and an elastic member is disposed between the sliding block (52) and the sliding groove (41); the clamping plate (2) is provided with a movable groove through which the connecting post (53) passes, and the mounting plate (1) is provided with a clamping structure matched with the clamping post (54).

2. The quick-release trough plate hanger according to claim 1, wherein the mounting plate (1) is provided with a recess, and the two ends of the recess are provided with edge clips (11); one side of the clamping plate (2) is turned inwards to form an L-shaped groove, and the other side is turned inwards to form a C-shaped groove; the clamping post (54) is disposed in the L-shaped groove, the edge clip (11) on one side is clamped with the clamping post (54), and the edge clip (11) on the other side is slidably installed in the C-shaped groove.

3. The quick-release trough plate hanger according to claim 2, wherein the edge clip (11) has an n-shaped structure.

4. The quick-release trough plate hanger according to claim 1, wherein the lock body (4) is fixed on the clamping plate (2) by bolts.

5. The quick-release trough plate hanger according to claim 1, wherein a side surface of the sliding groove (41) is provided with a mounting post (43), and a side surface of the sliding block (52) close to the mounting post (43) is provided with a mounting groove (44); and one end of the elastic member is connected with the mounting post (43) and the other end thereof is connected with the mounting groove (44).

6. The quick-release trough plate hanger according to claim 1, wherein the mounting plate (1) is provided with two L-shaped grooves; one side of the clamping plate (2) is provided with an L-shaped plate, and the other side is provided with the clamping post (54); and the L-shaped plate is slidably installed in one of the L-shaped grooves, and the clamping post (54) is clamped into the other L-shaped groove.

* * * * *